United States Patent [19]
Yamashita

[11] 3,910,688
[45] Oct. 7, 1975

[54] REAR-VIEW MIRROR WITH REFLECTIVE COATING ON FLEXIBLE STRIP FOR AUTOMOBILE

[75] Inventor: Makoto Yamashita, Kanagawa, Japan

[73] Assignee: Ichikoh Industries Limited, Tokyo, Japan

[22] Filed: Feb. 20, 1974

[21] Appl. No.: 444,545

[30] Foreign Application Priority Data
Feb. 22, 1973  Japan............................ 48-20696

[52] U.S. Cl. ................ 350/278; 350/279; 350/288
[51] Int. Cl.²...................... B60R 1/04; G02B 5/08
[58] Field of Search ......................... 350/278–283, 350/277, 288

[56] References Cited
UNITED STATES PATENTS
| | | | |
|---|---|---|---|
| 2,881,655 | 4/1959 | Eisenschink | 350/278 X |
| 3,603,672 | 9/1971 | Bastide | 350/283 X |
| 3,773,406 | 11/1973 | Baumgardner et al. | 350/283 X |

*Primary Examiner*—John K. Corbin
*Attorney, Agent, or Firm*—Wenderoth, Lind & Ponack

[57] ABSTRACT

A rear view mirror for use in an automobile having a film mirror made of reflectively coated ring-like transparent film, a pair of parallel rollers to engage with the film, and a rotating shaft to move the film. The transparent film has various patterns printed on it for effectively recognizing a distance between cars and the following car's lateral positions on a highway. The transparent film may also have a long length and be adapted to be take-up on a taking-up shaft, so that many kinds of patterns or reflection factors can be obtained.

6 Claims, 11 Drawing Figures

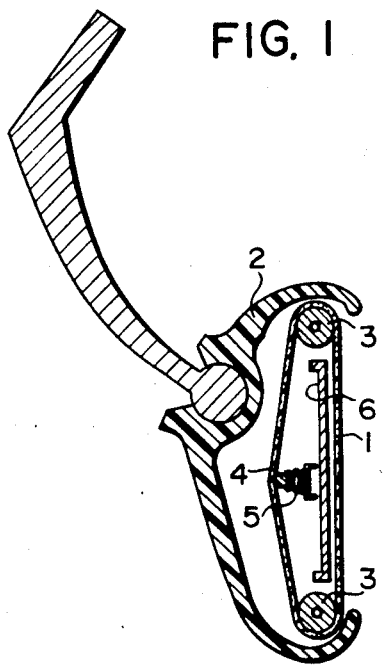
FIG. 1
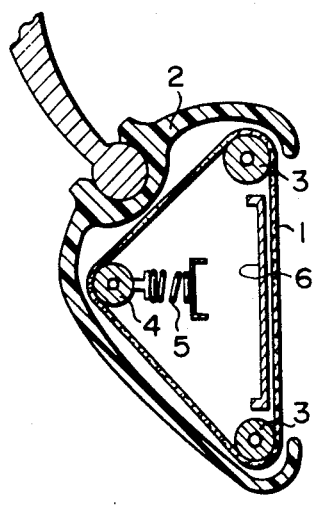
FIG. 2
FIG. 3
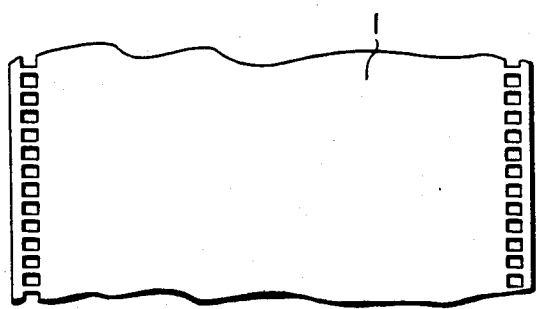

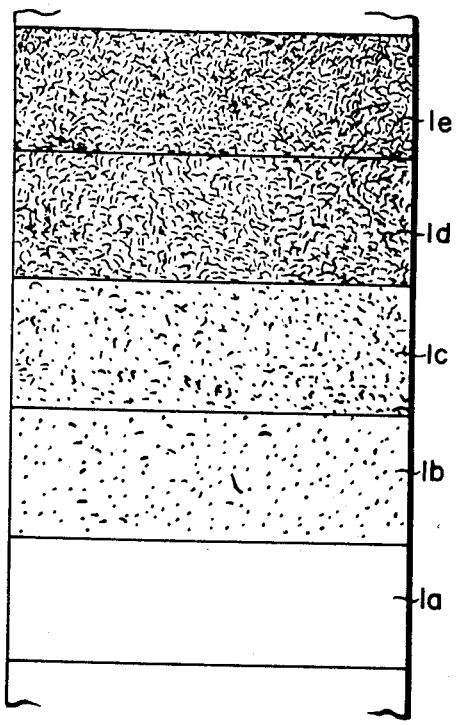
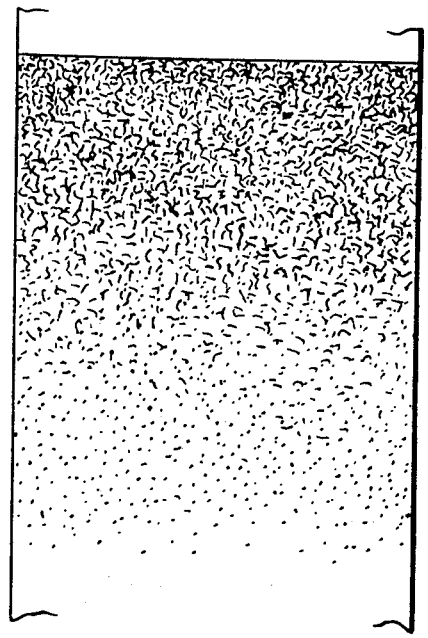
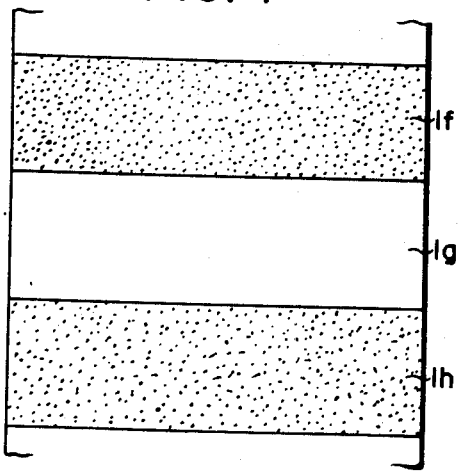
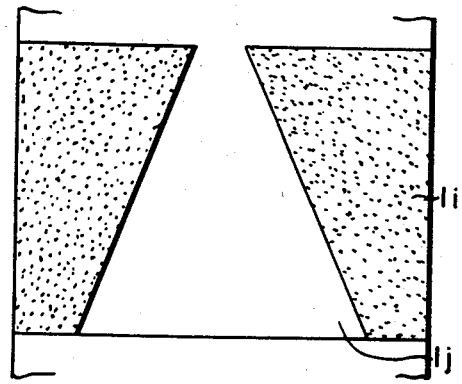

REAR-VIEW MIRROR WITH REFLECTIVE COATING ON FLEXIBLE STRIP FOR AUTOMOBILE

BACKGROUND OF THE INVENTION a. Field of the Invention

The present invention is concerned with a rear view mirror for use in automobiles and more particularly with a rear view mirror adapted to prevent car drivers from being dazzled by the headlights of rear cars.

b. Description of the Prior Art

According to the prior art, the rear view mirror of the kind, which is called a prism mirror apparatus, comprises a thick glass plate, the rear surface of which is coated with a reflective film and the front surface of which is ground obliquely to the rear surface in so that the directions of the reflection beams on the rear surface deviates from the direction of the beams on the front surface, thereby providing two kinds of reflectivities. At night, the beams reflected from the front surface of the prism mirror are used and rear vision is obtained under the reflectivity of about 4%. In the daytime, the beams are reflected from the rear surface and a rear vision is provided under the reflectivity of about 80%.

However, in order to obtain effective dazzling-prevention while preserving a clear rear vision at night, a rear view mirror having a reflectivity of about 10 – 15% is desired and such an ideal reflectivity can not be obtained by using the prism mirror of the prior art. Furthermore, since the prism mirror apparatus includes a thick glass plate, the weight of the apparatus is great and the pivot joint between the mirror-housing and the supporting stem or between the supporting stem and the roof plate of the automobile is apt to be bent due to vibration of the car. During a collision of the car provided with the heavy prism mirror apparatus, a car driver is in danger of being injured because of his striking the prism mirror.

SUMMARY OF THE INVENTION

It is, therefore, a primary object of the present invention to provide a car rear view mirror having a reflectivity which can be changed according to the condition surrounding the car.

Another object of the present invention is to provide a rear view mirror which is light, rigid and capable of effectively lowering the degree of injury to the driver and to the car during a collision.

Still another object of the present invention is to provide a rear view mirror adapted to enable the driver to effectively recognize the distance between the cars and the position of the following car by providing patterns on the film mirror.

Still a further object of the present invention is to provide a new and improved rear view mirror which is inexpensive to manufacture.

Other objects, features and advantages of the present invention will become apparent by reading the following detailed described when taken in conjunction with the accompanying drawings.

BRIEF DESCRIPTION OF THE DRAWINGS

FIG. 1 is a sectional view showing an embodiment of the present invention.

FIG. 2 is a sectional view showing an alternative embodiment of the present invention.

FIG. 3 is an explanatory view of a film of the present invention which is applicable to both embodiments of FIGS. 1 and 2.

FIGS. 5 to 9 are explanatory views of the film applicable to the embodiment as shown in FIG. 4.

DETAILED EXPLANATION OF THE PREFERRED EMBODIMENTS

Figure 4:
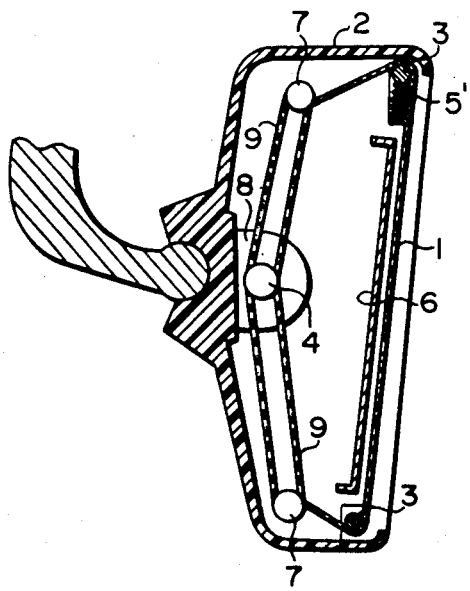
FIG. 4 is a sectional view showing another embodiment of the present invention.

It will be understood that like parts are designated by like numerals in the following explanation of the preferred embodiments of the present invention.

By referring to FIGS. 1 and 2, it is shown that a rear view mirror according to the present invention is generally comprised of a film mirror 1, a housing 2 and rollers 3, 3. On a rear surface of a film made of a synthetic resin such as polyester like Tetoron (a trade name of one of the synthetic resins in Japan), there is provided a coating of vacuum-evaporated aluminium, chrome or the like. The rollers 3, 3 are rotatably mounted onto the side walls of the housing 2. These rollers are parallel with each other. The film mirror 1 is wound around the upper and lower rollers 3, 3, and both ends of the film are connected with each other so as to make a ring shape. In the operation of mounting the film mirror 1 onto the housing, the vacuum-evaporated coated surface of the film mirror 1 in the shape of ring is adapted to be on the inside surface of the ring. Within an inner space of the housing 2, a rotating shaft 4 is situated and said shaft 4 penetrates through a wall of the housing 2 so as to be arranged in parallel with the rollers 3, 3. The rotating shaft 4 is movable in a direction perpendicular to an axis of the rotating shaft and pushes backwardly against the film mirror 1 through the coated surface thereof in accordance with the pressing action of a compression spring 5. The compression spring 5 is situated at a rear portion of the rotating shaft 4 or within the inner space surrounded or defined by the film mirror 1.

In order to manually rotate the rotating shaft 4, a crank arm (not shown) is attached to an extended end portion of the rotating shaft 4. A holding and protecting plate 6 is situated along the rear surface of the film mirror 1 so as to leave a small gap between the film mirror 1 and the protecting plate 6 which is arranged substantially in the space between the rollers 3, 3. When cleaning the front or external surface of the film mirror 1 by means of, for example, a brush, the plate 6 holds the film mirror 1 in a predetermined position and protects the film mirror from being broken.

When the rotating shaft 4 is rotated by manually rotating the crank arm (not shown), the film mirror 1 runs around the rollers 3, 3.

According to the second embodiment of the rear view mirror of the present invention, as shown in FIG. 2, the housing 1 is made sufficiently large so that the respective points of the three rotating axes of both the rotating shaft 4 and the rollers 3, 3 can be substantially situated at the apexes of a triangle formed by the film mirror 1. Thus, the total length of the film mirror 1 can be about three times as long as a unit length of a front portion of the film mirror so that the film mirror 1 can advantageously have three kinds of reflectivity.

According to the preferred embodiments of the present invention as shown in FIGS. 1 and 2, the film mirror 1 has a number of perforations formed along side edges of the film mirror as illustrated in FIG. 3. The perforations are adapted to engage with teeth formed on a periphery of the rotating shaft 4 in order to move the film mirror 1 effectively.

In the first and second embodiments of the present invention, the compression spring 5 is provided to tension the film mirror 1 between the rollers 3, 3 and prevent any wrinkles from developing therein. That is to say, the compression spring 5 removes or absorbs any expansion and contraction of the film mirror 1 which will be caused by the change of temperature and humidity surrounding the rear view mirror.

The film mirror 1 according to the present invention is provided with various coatings, each having the respective reflection characteristic or reflectivity thereby change the reflectivity as desired in accordance with the condition of the view to be seen through the rear view mirror 1. For example, a half of the coating of the film mirror 1 is adapted to have about 80% of reflectivity and the other half of the coating is constructed so as to have about 15% of reflectivity. Either one of both the reflectivity on the coating can be used as desired.

The protecting plate 6 further functions to absorb light beams passing through a portion having the lower reflectivity on the vacuum-evaporated coating of the film mirror 1. To this end, the entire surface of the protecting plate 6 may be designed so as to irregularly reflect the light beams passing through the film mirror 1.

FIG. 4 shows the third embodiment of the present invention. According to the third embodiment, various degrees of reflectivity of the coatings formed on the film mirror 1 may be properly selected.

In the housing 2 of the third embodiment, taking-up shafts 7, 7 are provided for taking up the film mirror 1 behind the rollers 3, 3. The shafts 7, 7 are synchronously rotated by means of the rotating shaft 4 of a motor 8. The roller 3 situated at an upper portion of the housing 2 is placed at a predetermined place by means of a spring 5' so as to strain the film mirror 1 by the rollers 3, 3 and remove any wrinkles formed in the film mirror. Thus, the film mirror 1 of the third embodiment is constantly held in a tensed or strained condition. The rotational movement of the rotating shaft 4 is transmitted to the taking-up shafts 7, 7 through a set of chains 9, 9 wound around the rotating shaft 4 and the taking-up shafts 7, 7. The construction of the protecting plate 6 is the same as those employed in the embodiments illustrated in FIG. 1 and FIG. 2.

As a result of this construction of the third embodiment, it is possible to employ a long film mirror 1 having various degrees of reflectivity as shown in FIG. 5. Consequently, a particular coating having the most desirable reflectivity for a particular environmental condition can be selected from several kinds of coatings having various reflectivity. For example, a film mirror portion 1a having a coating of the lowest reflectivity, for instance, 3 – 4% is used when automobiles equipped with the film mirror 1 according to the present invention is subjected to the light beams from a head light of a nearing car from behind on a rapid transit high-way. On the other hand, a portion 1e having the highest reflectivity is used on rainy days, in the evening or in the daytime of weak sunlight. When the automobiles carrying the film mirror of the present invention are running on a road along a coast in midsummer or on a snow-covered road on a fine day, or in the streets at night, portions 1b, 1c and 1d having intermediate reflectivity are used.

As apparent from FIG. 6, in accordance with another embodiment of the coating of the film mirror 1 of the present invention, the coating is formed in such a way that the light reflectivity is changed successively in order to improve the dazzling preventing effect of the film mirror.

As shown in FIG. 7, the film mirror may be provided with a portion where only the light beams of a particular frequency (wave length) are reflected or a portion where the above-mentioned beams are not reflected. This is an extremely desirable arrangement, because the frequency characteristic of the lights varies in accordance with its sources. In order to obtain a proper or suitable dazzling-prevention effect for a particular environmental condition with the film mirror, it is not preferable to uniformly lower values of the reflectivity of the coating on the film mirror 1. The film mirror must be constructed so as to remove light beams of any frequency subjecting a car driver to dazzle and yet reflect as many effective light beams of objects on the road as possible in order to see and confirm what the object is.

In the film mirror 1 of FIG. 7, a portion 1f, for example, has the frequency characteristic for substantially removing or preventing ultraviolet rays (4,000 – 3,000 A) from passing therethrough and is used when the automobile having the film mirror 1 of the present invention is operations along a beach-side road in midsummer or a snow-covered road on a fine day in order to protect eyes of the drivers. A portion 1g formed to remove or cut infrared rays (7,000 – 9,000 A) is used at night and intercepts the passing of the infrared rays constituting a greater part of the head light, and a portion 1h is adapted to have a reflection characteristic so as to reflect only the beams having a frequency of 5,500A which are the most sensitive to human eyes. The portion 1g is used during such environmental conditions as evening and on a rainy day, because said portion has a particular reflection characteristic suitable for being used in some dark condition of a view.

According to the fourth embodiment of the present invention as shown in FIG. 8, the film mirror 1 has a coating provided with a pair of portions 1a at both sides of the film mirror and a central portion 1j having a variable width. When the film mirror 1 is constructed according to is fourth embodiment of the present invention, the range of vision of the film mirror can be varied by rotating the rollers carrying the film mirror. Since many wide roads have recently been built, a number of rear view mirrors capable of seeing the wide range of vision also have been developed. However, when such a rear view mirror having this wide range of vision is used in the automobile while operating along a narrow road, unnecessary visual information situated along the outside of the side edges of the narrow road will be reflected and will only disturb the drivers attention paid to his safe driving. As is apparent from the above description, in order to easily regulate the range of vision in accordance with the width of the road along which the car is running, the film mirror having the coating of the fourth embodiment is used or employed for automobiles or cars.

Figure 9:
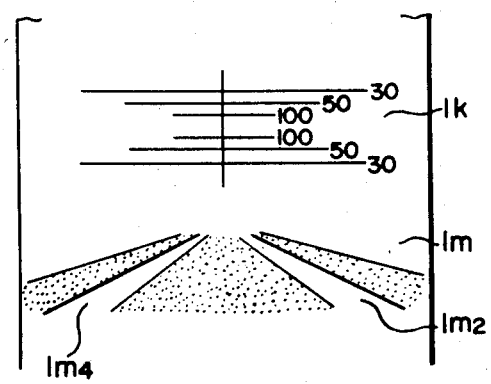

According to a fifth embodiment of the coating of the film mirror 1 as shown in FIG. 9, the coating has a pattern $1k$ and reflective and non-reflective zones $1m$, $1m_2$ and $1m_4$. The distance between two cars moving along the road can be easily measured by using the coating of the fifth embodiment of the present invention. In using the coating and measuring the distance between the cars, the height of the following car is indicated on the coating and measured by scale lines provided on the film mirror 1 in order to know the distance between the cars. The respective heights of various small cars on the ground are substantially equal to each other, and the distance between the film mirror situated on an interior portion of the car and the driver's eyes is also substantially constant so that the height indicated on the coating shows the distance between the cars.

By using the coating $1m$ having two portions $1m_2$ and $1m_4$, the positions of the following cars are easily known. That is to say, when the moving cars are seen in a right line $1m_2$, the driver of the car having the film mirror can recognize that the following car is moving along in the right passing zone of the road. It is difficult to know the position of a following car particular for a beginning driver, so the film mirror 1 having the coatings $1k$ and $1m$ of various reflection zones $1m_2$ and $1m_4$ is extremely useful. When the portions $1m_2$ and $1m_4$ of the film mirror 1 are painted yellow, the time necessary for recognizing the presence of following cars in the passing zone of the road becomes shorter.

Figure 10:
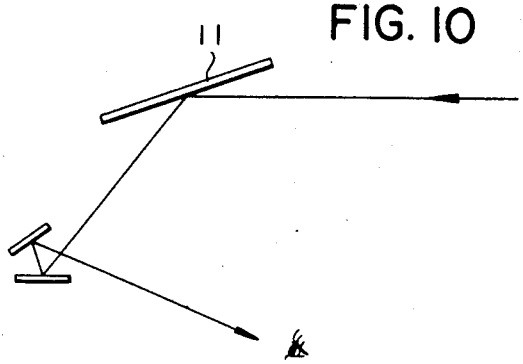
FIG. 10 is a schematic explanatory view of a periscope type rear view apparatus which is capable of using a rear view mirror of the present invention.
Figure 11:
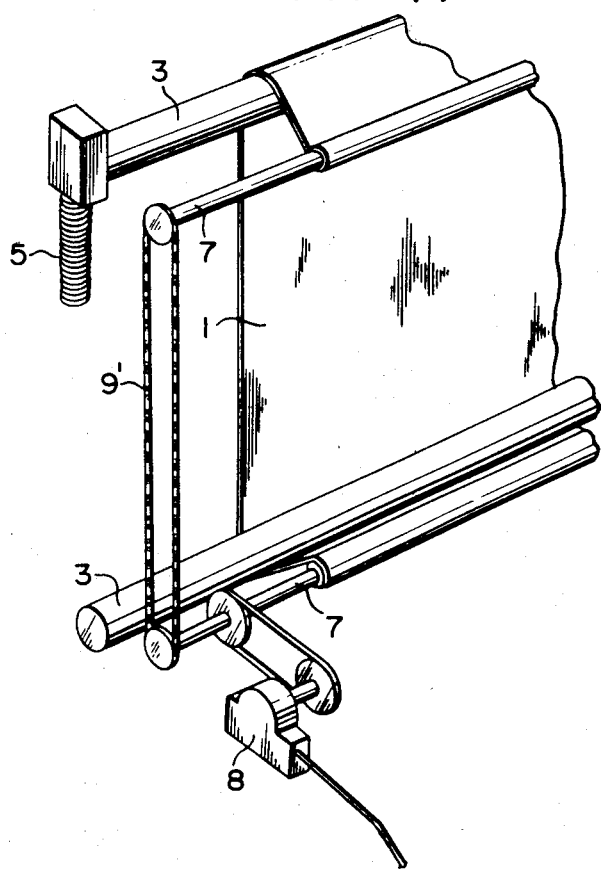
FIG. 11 is an explanatory view of a rear view mirror of the present invention which is applicable to this periscope type rear view apparatus.

The film mirror 1 constructed as shown in FIGS. 1, 2 and 4 may be used and assembled in the rear view mirror arrangement or apparatus of a periscope type shown in FIG. 10.

According to the rear view mirror apparatus of the periscope type, the film mirror of the present invention does not require any housing but employs an arrangement for a taking-up and rewinding mechanism. Considering the difference between the rear view mirrors of FIG. 4 and FIG. 10, the apparatus of FIG. 10 eliminates the housing 2 and employs a chain 9' for connecting both taking-up shafts 7, 7 in order to synchronously rotate them. The film mirror 1 is adapted to be strained without any wrinkles in the film by means of the spring 5' and moved by the electric motor 8 similar to the embodiment of FIG. 4.

As apparent from the above explanation of the various embodiments of the present invention, the whole mechanism is advantageously light in its weight, because a film material of synthetic resin is used instead of glass. Accordingly, when the driver strikes the film mirror of the present invention for any reason, the film will not be broken and moreover his resulting injury will not be as serious. Furthermore, a multi-staged changeability of the reflectivity is obtained by the use of the film mirror of the present invention, so that desired rear viewing of the vehicle is obtained.

What I claim is:

1. A rear view mirror for an automobile comprising:
    a mirror strip of flexible, transparent material having
    a reflective surface coating;
    a mirror housing surrounding said mirror strip, said housing having an opening therein directed toward the inside of said automobile;
    roller means within said mirror housing engaged with said mirror strip for stretching and rotating said mirror strip across said opening; and
    backing means within said mirror housing behind said mirror strip and said opening for providing a solid surface behind said mirror strip.

2. A mirror as claimed in claim 1 wherein said roller means is comprised of:
    two spacing rollers, one above and one below said opening, engaged with said mirror strip, whereby said mirror strip is stretched across said opening;
    two winding rollers within said housing behind said spacing rollers and attached to the ends of said mirror strip;
    rotating means operatively connected to said winding rollers for rotating said winding rollers and winding and unwinding the mirror strip ends attached to said winding rollers, whereby operating said rotating means will cause said mirror strip to move across said opening; and
    spring means biased against at least one of said spacing rollers for inducing a tension to the mirror strip surrounding said spacing rollers, thereby preventing wrinkles in said mirror strip at said opening.

3. A rear view mirror as claimed in claim 1 wherein:
    the ends of said mirror strip are joined together, forming a continuous tube-like mirror strip, and
    said roller means is comprised of
    two spacing rollers, one above and one below said opening, engaged with the inside surface said mirror strip, whereby said mirror strip is stretched across said opening;
    rotating means behind said spacing rollers within said housing engaged with the inner surface of said mirror strip, for rotating said tube-like mirror strip; and
    spring means biased against said rotating means for imparting a tension to said mirror strip so that wrinkles will not form in said mirror strip at said opening.

4. A rear view mirror as claimed in claim 1, wherein said reflective mirror strip is comprised of successive coated portions along the length of the material, each of said coated portions having a different reflection characteristic, whereby operating said roller means will cause said mirror strip to rotate until the desired coated portion is visible in said opening.

5. A rear view mirror as claimed in claim 1 wherein said reflective mirror strip is patterned thereon for determining the distance from and the lateral positioning of the objects reflected thereby.

6. A rear view mirror as claimed in claim 1 wherein the reflective coating of said mirror strip continuously decreases in width equally along both sides of the longitudinal axis of said material.

* * * * *